April 24, 1962
C. F. ALBAN
3,030,699
HIGH ELECTRICAL RESISTIVITY THERMOSTATIC METAL
Filed Dec. 22, 1960
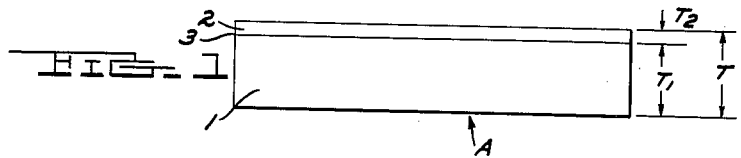
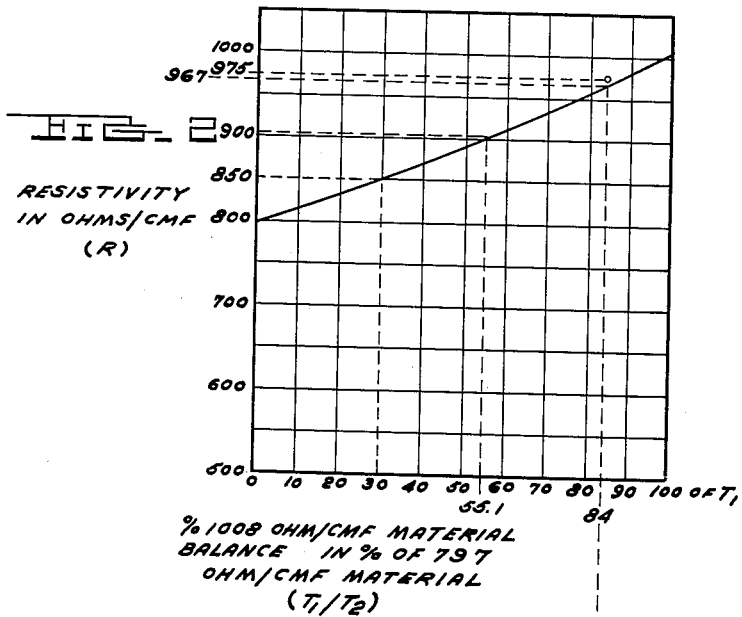
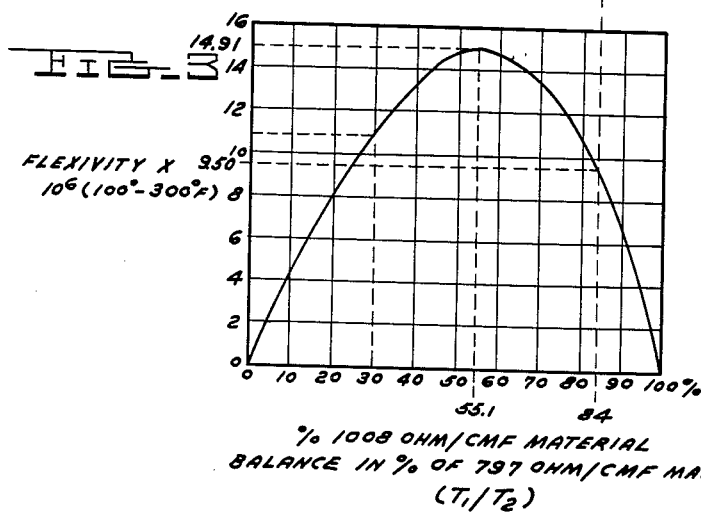
INVENTOR.
CLARENCE F. ALBAN
BY
Barnes, Kisselle, Raisch & Choate
ATTORNEYS

United States Patent Office 3,030,699
Patented Apr. 24, 1962

3,030,699
HIGH ELECTRICAL RESISTIVITY THERMOSTATIC METAL
Clarence F. Alban, Allen Park, Mich., assignor to W. M. Chace Company, Detroit, Mich., a corporation of Michigan
Filed Dec. 22, 1960, Ser. No. 77,710
7 Claims. (Cl. 29—183.5)

This invention relates to laminated thermostatic metals having high electrical resistivity.

Laminated thermostatic metals comprise two or more laminae of metals or metal alloys having different temperature co-efficients of expansion so that upon a change of temperature the metal will bend or flex due to the differential expansion of the laminae. The laminae are preferably joined by using known high temperature, pressure and time diffusion techniques in the solid state condition of the alloys to produce a high strength weld between the respective layers.

The known metal alloys suitable for use in laminated thermostatic metal elements, such as in bimetal strips, are limited in number since their performance over a broad range of temperature depends upon an optimum combination of a number of properties. Among these properties are: co-efficient of expansion, modulus of elasticity, elastic limit after cold rolling, ductility, metallurgical stability, strength at various temperatures and electrical resistivity. Electrical resistivity is particularly important in bimetals used in circuit breakers since such bimetals are directly heated by the electrical current flowing therethrough. There is an ever-present demand for circuit breakers with lower ampere ratings, and hence there is a need for a bimetal combination having as high an electrical resistivity as possible consistent with the other physical properties required for best performance.

Accordingly, it is an object of the present invention to provide laminated thermostatic metals having high electrical resistivities so that such metals may be heated directly by relatively small electrical currents without sacrificing flexivity or other established performance requirements.

Another object is to provide a bimetal lamination in which the thicknesses of the respective laminae are correlated with the alloy composition thereof to produce the highest possible electrical resistivity consistent with a usable co-efficient of deflection.

In the accompanying drawing:

FIG. 1 is an elevational view of a bimetal strip produced in accordance with the invention;

FIG. 2 is a graphic representation of thickness ratios of the bimetal strip plotted against the resistivity of the strip when utilizing an alloy combination of the invention; and FIG. 3 is a graphic representation of the thickness ratios of the bimetal strip plotted against the flexivity of the strip when utilizing the alloy combination of FIG. 2.

Referring in detail to the drawing, FIG. 1 shows a laminated thermostatic metal element comprising a thermostatic bimetal strip A which may be incorporated in structures well known in the art to provide an arm which deflects under the influence of temperature changes therein. Bimetal A is constructed by using the aforementioned diffusion welding techniques whereby a high expanding alloy lamina 1 is bonded to a low expanding alloy lamina 2 at the adjacent faces thereof indicated at 3.

Such thermostatic bimetals when used in circuit breakers are commonly connected as a conducting element in the circuit and the heat developed by the current flowing longitudinally therethrough is converted to mechanical work to open or close suitable contacts, as is well understood in the electrical art. The electrical power loss through bimetal A is represented by $I^2R$, where I is current in amperes in bimetal A and R is the total resistance in ohms thereof. This power loss is converted to heat energy which determines the temperature of bimetal A for a given heat transfer condition. It will be evident that in order to develop the $I^2R$ effect to a usable level in circuit breakers, the electrical resistivity of the bimetal must be as high as possible. The highest electrical resistivity hitherto known to applicant in a thermostatic bimetal is 850 ohms per circular mil foot. Such prior art material has established the lower limit on the ampere ratings of circuit breakers.

In order to provide circuit breakers of lower ampere ratings the present invention correlates the composition and thickness of high expanding alloy lamina 1 with the composition and thickness of low expanding alloy lamina 2 to provide a combination having as much total electrical resistance as possible with adequate thermal deflection. It is known that electrical current is carried in parallel in laminae 1 and 2 of bimetal arm A as follows:

(1) $$\frac{T}{R}=\frac{t_1}{r_1}+\frac{t_2}{r_2}$$

where $R$ = the resistivity of the composite bimetal A
$t_1$ = thickness of lamina 1
$t_2$ = thickness of lamina 2
$T$ = total thickness of composite bimetal $A = t_1 + t_2$
$r_1$ = resistivity of lamina 1
$r_2$ = resistivity of lamina 2

Solving Equation 1 algebraically gives:

(2) $$R=\frac{r_1 r_2 T}{t_1 r_2 + t_2 r_1}$$

From this equation it will be seen that to obtain the highest value of total resistance R in the composite bimetal A, it is necessary that the lamina having the maximum thickness must also have the maximum resistivity. However, the ratio of thickness $t_1$ of lamina 1 to the thickness $t_2$ of lamina 2 must be adequate to create the necessary forces in bimetal A during differential expansion to produce a usable amount of thermal deflection. In most thermostatic bimetals maximum thermal deflection is obtained by the following known relationship:

(3) $$\frac{t_1}{t_2}=\sqrt{\frac{E_2}{E_1}}$$

where $E_1$ = modulus of elasticity of lamina 1
$E_2$ = modulus of elasticity of lamina 2

The present invention provides a laminated bimetal which is a combination of particular high and low expanding alloys which together provide a high value of resistivity in the bimetal. In addition, the respective laminae of these alloys may have a novel thickness ratio which deviates from the ratio of Equation 3 for such alloys in order to further maximize the electrical resistivity of the bimetal consistent with adequate thermal deflection thereof. To provide this combination which deviates from the above thickness ratio (3) the following alloy laminae are used in a preferred embodiment:

High expansion lamina 1 comprises an alloy of 72% Mn, 18% Cu, and 10% Ni having a thickness $t_1$ of .9600 inch.

Low expansion lamina 2 comprises an alloy of 17% Cr, 4% Al, and the balance Fe having a thickness $t_2$ of .1830 inch.

The length and width of the composite bimetal ingot are selected as necessary to yield production quantities of usable material. The starting thicknesses do not have to be .960 and .183 inch, but this ratio wherein $t_1$ is about 84% of the total thickness of laminae 1 and 2 is preferred.

The typical properties of the above alloys are as follows:

|  | Lamina 1 | Lamina 2 |
| --- | --- | --- |
| Composition | 72% Mn, 18% Cu, 10% Ni. | 79% Fe, 17% Cr, 4% Al. |
| Expansion Coefficients from 100° F. to 300° F. | 14.94×10⁻⁶/° F | 5.00×10⁻⁶/° F. |
| Ohms/c.m.f. at 75° F | 1,008 | 797. |
| Modulus of Elasticity | 18,000,000 | 27,100,000. |

When the above high and low expanding alloy laminae 1 and 2 are bonded together by the aforementioned diffusion welding technique, a combination is produced having a flexivity of $9.3 \times 10^{-6}$ from 100° F. to 300° F. when tested using the American Society for Testing Materials Standard B106–56. The electrical resistivity of this combination is 975 ohms per circular mil foot when tested at room temperature using ASTM Standard B63–49. Hence, this new thermostatic bimetal extends the upper limit of electrical resistivity by approximately 15% over that of the aforesaid prior art thermostatic bimetal while achieving adequate flexivity.

Referring to FIG. 2 the relationship of the electrical resistivity of the above combined high and low expanding alloy laminae with respect to the ratios of the respective thicknesses $t_1$, $t_2$ thereof is shown graphically when R is computed in accordance with Equation 2. The respective thicknesses of the laminae 1 and 2 of the preferred bimetal A are in the ratio of approximately 84% of high expansion lamina to 16% of low expansion lamina, which as seen in FIG. 2 gives a theoretical electrical resistivity value of 967 ohms/c.m.f. This is in substantial agreement with the tested value of 975 ohms/c.m.f.

FIG. 3 shows graphically the relationsip of the flexivity of the above combined high and low expanding alloy laminae with the ratios of the respective thicknesses $t_1$, $t_2$ thereof. When the values of modulus of elasticity for the high and low expanding laminae 1 and 2 respectively are substituted in Equation 3 the ideal ratio for flexivity is found to be 55.1% $t_1$ to 44.9% $t_2$, providing a flexivity of $14.91 \times 10^{-6}$. The intercept of these values is seen to be located at the peak of the curve of FIG. 3. Plotting this ratio of 55.1%/44.9% on the curve of FIG. 2 indicates a resistivity value of approximately 900.7 ohms/c.m.f. Thus when the particular alloys described above are combined in accordance with the invention to form a thermostatic bimetal, the resulting bimetal exceeds in resistivity the prior art value of 850 ohms/c.m.f. even when the particular alloys are combined according to the high activity thickness relationship of Equation 3.

While as shown in FIG. 2 the electrical resistivity of the bimetal can be increased by increasing the percentage thickness of the high expanding alloy lamina 1 at the expense of that of the low expanding alloy lamina 2, it will be seen from FIG. 3 that the flexivity of the bimetal decreases from that obtainable when the thickness relationship is as indicated in Equation 3. The 84–16 ratio of the preferred combination thus represents a compromise which, however, is close to the upper resistivity limit of 1008 ohms/c.m.f. while providing relatively high thermal deflection properties. Within the limits established by practical flexivity rates the range of alloy compositions has been found to be as follows:

| (Lamina 1) High Expanding Alloy | (Lamina 2) Low Expanding Alloy |
| --- | --- |
| 72%±14% Mn<br>18%±9% Cu<br>10%±5% Ni | 17%±9% Cr<br>4% to 15% Al<br>Balance Fe |

From the foregoing it is to be understood that the invention provides two different alloy compositions which are combined for use as high and low expanding laminae to form a very high resistivity bimetal over a wide range of thickness ratios. When the percentage thickness $t_1$ of lamina 1 is increased from about 30% to about 84% the resistivity increases from about 850 to about 967 ohms/c.m.f. without having the flexivity drop below $9.3 \times 10^{-6}$. Moreover, as the curve of FIG. 3 indicates it is possible to deviate substantially from the known preferred thickness ratio of Equation 3 by increasing the thickness of lamina 1 without thereby causing a corresponding substantial decrease in flexivity. In other words the relationship is not linear, which permits a thickness ratio deviation up to that of 84–16 of the preferred embodiment of the invention before further deviation causes a marked drop off in flexivity.

I claim:

1. A laminated thermostatic metal including in combination, a lamina of high expanding alloy having a composition within the range of 58 percent to 86 percent manganese, 9 percent to 27 percent copper and 5 percent to 15 percent nickel, and a lamina of low expanding alloy having a composition within the range of 59 percent to 88 percent iron, 8 percent to 26 percent of chromium and 4 percent to 15 percent aluminum, said laminae being bonded together for causing thermal deflection in said thermostatic metal, the thickness of said lamina of high expanding alloy being within the range of about 30 to about 84 percent of the total thickness of said laminae so that said laminae together provide a high value of electrical resistivity with a usable coefficient of deflection whereby said thermostatic metal may be heated for operation by passing a relatively small electric current through said laminae.

2. The combination set forth in claim 1 wherein the thickness of said lamina of high expanding alloy comprises substantially 84 percent of the total thickness of said laminae so that the electrical resistivity of said thermostatic metal is maximized while obtaining a usable coefficient of deflection.

3. The combination set forth in claim 1 wherein said lamina of high expanding alloy is diffusion welded to said lamina of low expanding alloy by using high temperature, pressure and time diffusion techniques in the solid state condition of said alloys comprising said laminae to produce a high strength weld therebetween.

4. A laminated thermostatic metal comprising a first lamina of alloy having a composition of 72 percent manganese, 18 percent copper and 10 percent nickel, and a second lamina of alloy having a composition of 79 percent iron, 17 percent chromium, 4 percent aluminum, said first and second laminae being bonded together to form a bimetal, the thickness of said first lamina being within the range of about 30 to 84 percent of the total thickness of said laminae so that said laminae together provide a high value of electrical resistivity with a usable coefficient of deflection whereby said laminae may be heated for operation by passing a relatively small electric current through said laminae.

5. The combination set forth in claim 4 wherein the thickness of said first lamina comprises substantially 84 percent of the total thickness of said laminae so that the electrical resistivity of said bimetal is maximized while obtaining a usable coefficient of deflection.

6. The combination set forth in claim 4 wherein said thicknesses of said first and second laminae respectively equals .9600 inch and .1830 inch to provide a composite bimetal ingot having a flexivity of $9.3 \times 10^{-6}$ from approximately 100 to 300 degrees F. and having an electrical resistivity of approximately 975 ohms per circular mil foot at approximately 75 degrees F.

7. The combination set forth in claim 4 wherein said laminae are diffusion welded together by using high temperature, pressure and time diffusion techniques in the solid state condition of said alloys comprising said laminae to produce a high strength weld therebetween.

References Cited in the file of this patent

UNITED STATES PATENTS

| | | |
|---|---|---|
| 2,234,748 | Dean | Mar. 11, 1941 |
| 2,317,018 | Alban | Apr. 20, 1943 |
| 2,403,895 | Alban | July 16, 1946 |